UNITED STATES PATENT OFFICE.

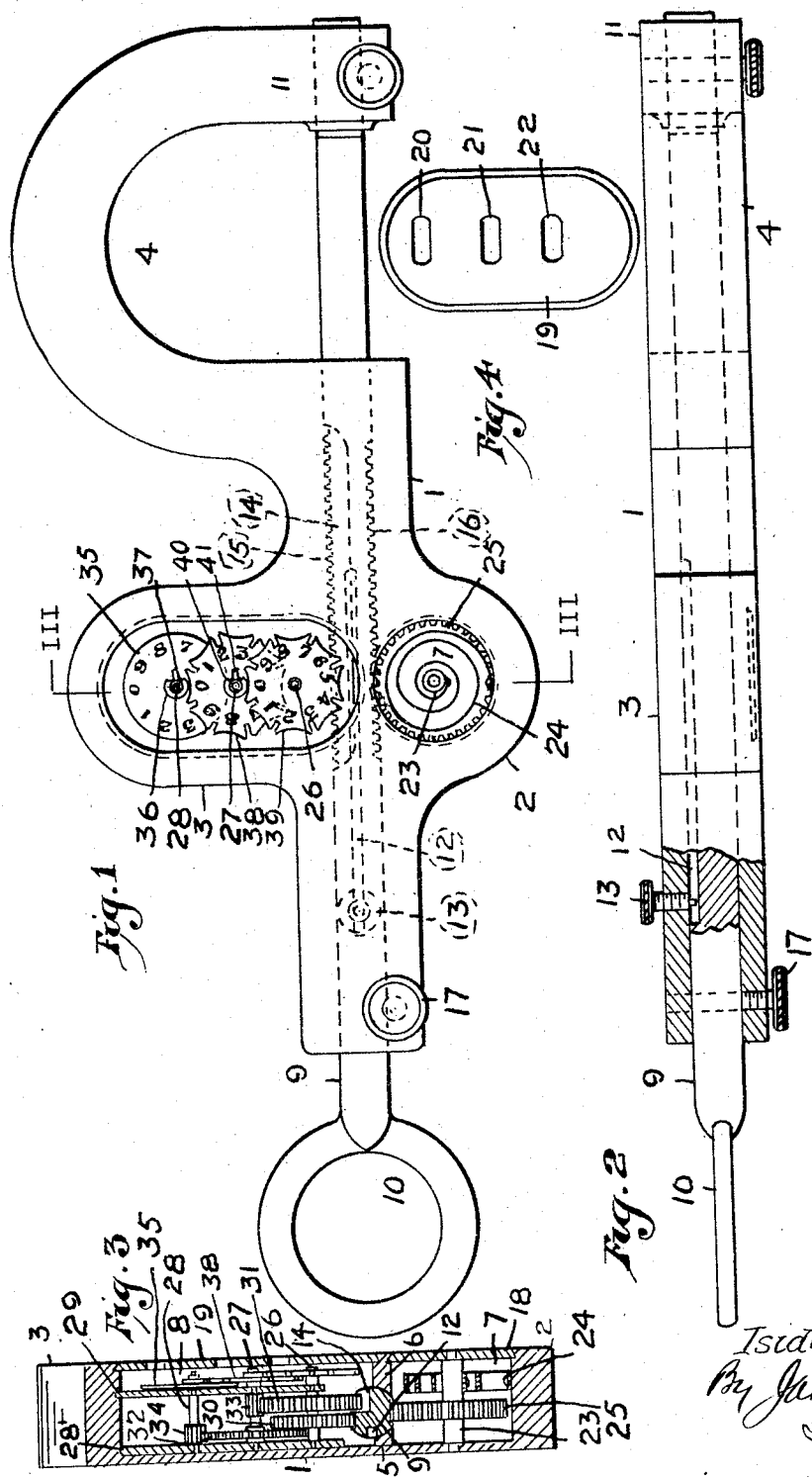

ISIDORE GREENWALD, OF PITTSBURGH, PENNSYLVANIA.

MICROMETER.

1,365,484.  Specification of Letters Patent.  Patented Jan. 11, 1921.

Application filed March 20, 1919. Serial No. 283,810.

*To all whom it may concern:*

Be it known that I, ISIDORE GREENWALD, a citizen of the United States of America, residing at Pittsburgh, in the county of Allegheny and State of Pennsylvania, have invented certain new and useful Improvements in Micrometers, of which the following is a specification.

This invention relates to micrometers, and has for its object to provide a device of such class, in a manner as hereinafter set forth, with means whereby the measurement of an article or object will be made visible to the operator without necessitating reference to a scale on a measuring bar or scale.

A further object of the invention is to provide a device of such class, in a manner as hereinafter set forth, with means for automatically indicating visibly to the operator a measurement when the device is used.

A further object of the invention is to provide a device of such class, in a manner as hereinafter set forth, with means for automatically indicating to an operator the measurement of an article or object when the device is used, and further to provide the device with means for setting the device at any measurement desired.

Further objects of the invention are to provide a device of such class, in a manner as hereinafter set forth, which is simple in its construction, automatic in its action, accurate, durable, strong, convenient and efficient in its use, readily set up, and comparatively inexpensive to manufacture.

With the foregoing and other objects in view the invention consists of the novel construction, combination and arrangement of parts as hereinafter set forth and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of the device with the front plates removed.

Fig. 2 is a top plan partly in section.

Fig. 3 is a section on line III—III Fig. 1, with the front plates in position.

Fig. 4 is a detail illustrating one of the front plates.

Referring to the drawings in detail 1 denotes a substantially rectangular body portion provided intermediate its ends with oppositely disposed extensions 2, 3, and which is further provided at one end with an enlarged yoke 4, between the end of which and the end of the body portion from which the yoke 4 projects the article or object to be measured is positioned. The body portion 1 is hollow, as well as the extensions 2, 3, and said body portion 1 is further provided with a pair of longitudinal ribs 5, 6 which form a seat for a purpose to be referred to. The seat is arranged within the body portion, and the ribs 5, 6 forming said seat are spaced from each other.

The extension 2, in connection with the body portion 1 provides a chamber 7 for a shifting device to be referred to, and the extension 3, in connection with the body portion 1, provides a chamber 8 for an indicating mechanism to be hereinafter referred to.

Arranged within and projecting from each end of the body portion 1 is a spring controlled combined measuring and actuating bar 9, having its rear end formed with a finger or thumb piece 10 to facilitate the setting of the bar 9. The forward end of the bar 9, normally abuts against a projection or lug on the arm 11, of the yoke 4, or it can abut directly against said arm 11.

The bar 9, is mounted on the seat formed by the ribs 5, 6, and has its rear formed with a groove 12, into which extends a guide screw 13, mounted in the body portion 1. The bar 9, centrally of its front is formed with a cutaway portion 14, to provide a clearance to a purpose to be referred to. The top of the bar 9 has a longitudinal row of teeth 15, and the bottom of the bar 9 has a longitudinal row of teeth 16.

Carried by the body portion 1, and associating with the bar 9 is a stop screw 17, the function of which is to maintain the bar 9, in an adjusted position, or in other words at a permanent measurement.

The chamber 7, has its front closed by a front plate 18, and the chamber 8, has its front closed by a front plate 19, which is formed with a series of slots or openings 20, 21 and 22. The plates 18 and 19 are secured in the extensions 2, 3 and body portion 1, in any suitable manner.

The bar 9, is controlled by a shifting device arranged in the chamber 7, and which consists of a shaft 23 journaled in the plate 18, and in the body portion 1. Secured to the extension 2 and to the shaft 23 is a coiled spring 24, which latter surrounds the shaft 23. Fixed to the shaft 23 is a gear wheel 25, which meshes with the teeth 16. The bar 9 is shifted rearwardly against the action of the spring 24, whereby when the bar 9 is released, the gear 25 revolving through the action of the spring 24, will shift the bar 9 forwardly.

Arranged within the chamber 8, is an indicating mechanism for setting forth to an operator the measurement of an object which is positioned in the yoke 4 and when the mechanism is operated from normal position. The mechanism is operated from normal position by the shifting of the bar 9 rearwardly and restored to normal position when the bar is shifted forwardly. The indicating mechanism consists of the shafts 26, 27 and 28 arranged one above the other and journaled in the front plate 19 and also in a bearing plate 28 secured to the extension 3 within the chamber 8. A partition plate 29 is secured to the extension 3 and through which extends forwardly the shafts 26, 27 and 28.

Carried by the shaft 26 is a pair of gear wheels 30, 31; the latter is of larger diameter than the former. The gear 30 meshes with the teeth 15 so that it will be actuated during the shifting of the bar 9. The shaft 27 is provided with a gear wheel 32 and a pinion 33; the latter meshes with the gear 31. The shaft 28 has a pinion 34 which meshes with the gear 32.

Fixed to the shaft 28 is an indicator disk 35 provided with a scale. The shaft 28 also carries a pinion or rather a small disk 36 provided with a tooth 37, adapted to engage and operate a notched indicator disk 38, loosely mounted on the shaft 27. Loosely mounted on the shaft 26, is a notched indicator disk 39, which is engaged and actuated by a cam disk 40 on the shaft 27. The disk 40 has a tooth 41. The disks 38 and 39 are provided with a suitable scale. Spacing collars are provided for the disks 38 and 39.

When the bar 9 is shifted the shafts 26, 27 and 28 are revolved which will cause the actuation of the disks 35, 38 and 39 and when movement of the bar 9 is stopped, indicia indicating measurement will be visible through the slots 20, 21 and 22.

The proportional movement of the indicator disks will be set up relative to the scale of measurement, owing to the manner in which the indicator mechanism is arranged relatively to the bar 9, therefore it is obvious that on movement of the bar indicia indicating measurement will be readily visible through any or all of the openings in the front plate 19. This manner of indicating the measurement of an article is had automatically owing to the arrangement of parts as hereinbefore set forth.

What I claim is:—

1. A micrometer comprising a shiftable measuring bar provided with two rows of teeth, means engaging with one row of teeth for visibly indicating a measurement when the bar is shifted from normal position, and means engaging with the other row of teeth for restoring the bar to normal position after the measurement has been indicated.

2. A micrometer comprising a measuring bar, shiftable from normal position to cause the indicating of a measurement, means operatively engaging with one side of and operated by the bar for visibly indicating a measurement when the bar is shifted from normal, a spring actuated gear operatively engaging in the other side of the bar for automatically restoring the bar to normal position after the measurement has been indicated, and means engaging the bar for maintaining the latter from movement when the measurement is made to keep such measurement permanently visible.

In testimony whereof I affix my signature.

ISIDORE GREENWALD.